Patented Aug. 11, 1936

2,050,929

UNITED STATES PATENT OFFICE 2,050,929

PROCESS FOR BREAKING PETROLEUM EMULSIONS

Melvin De Groote, St. Louis, Mo., assignor to Tretolite Company, Webster Groves, Mo., a corporation of Missouri No Drawing. Application December 21, 1935, Serial No. 55,616

4 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of my invention is to provide a novel and inexpensive process for separating emulsions of the character referred to into their component parts of oil and water or brine.

Briefly described, my process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent used in my process consists of a chemical compound characterized by the presence of both an oxy-octadecadiene acid residue and a keto fatty acid residue derived from castor oil, in the same molecule.

In U. S. Letters Patent to Melvin De Groote and Bernhard Keiser, No. 2,023,997, dated December 10, 1935, there is described a process for breaking emulsions by means of oxy-octadecadiene acid bodies. As stated in said patent, octadecadiene acid is a material of the following formula:

It is commonly referred to as octadecadiene-9, 11-acid-1. This is the particular isomer derived from castor oil or ricinoleic acid, and hereinafter the expression "octadecadiene acid" will refer to this particular acid, insofar that it is the one which is commercially available.

As stated in U. S. Letters Patent No. 1,920,585 to Ott and Schussler, dated August 1, 1933, it is obtainable by splitting off water from ricinoleic acid ($C_{18}H_{34}O_3$) of the formula:

In producing the demulsifying agent employed in my present process, octadecadiene acid of suitable purity may be subjected to oxidation by any of the methods conventionally employed for oxidation of castor oil and the like. My preference is to oxidize octadecadiene acid at a relatively low temperature by means of moist air under pressure. I prefer to use a temperature of 125 to 135° C., and to use approximately 45 to 75 lbs. pressure. If desired, octadecadiene acid may be oxidized at a higher temperature by means of air or oxygen at atmospheric pressure. Furthermore, it may be oxidized in the presence of an inert material, if more convenient to reduce the viscosity during oxidation by means of such added material.

I have referred to the product obtained by oxidizing octadecadiene acid as "oxy-octadecadiene acid". The expression "oxy-octadecadiene acid" is intended to refer to the derivatives in which additional oxygen has been introduced into the molecule, for instance, as indicated by the formula $C_{18}H_{32}O_3$. This represents the saturation of an ethylene linkage, or perhaps, the partial saturation of two ethylene linkages, or the formation of a new ethylene linkage by means of an added oxygen atom. I do not know exactly the composition of the product obtained by the initial oxidation of octadecadiene-9, 11-acid-1. The reaction presumably is comparable to the saturation of conjugated double bonds by halogens or similar reagents. Under such circumstances a new ethylene linkage may be created. (See "Textbook of Organic Chemistry", by Bernthsen, 1931 edition, page 840.) It is believed that oxidation, especially with moist air, results in the conversion of this added oxygen into two hydroxyl radicals, so that one ultimately obtains hydroxylated octadecadiene-9, 11-acid-1, as indicated by the formula $C_{18}H_{32}(OH)_2O_2$. In other words, the addition product of octadecadiene-9, 11-acid-1 is the substitution product, at least hypothetically, of the corresponding semi-saturated acid of the composition $C_{18}H_{34}O_2$, i. e., apparently dihydroxy iso-oleic acid. Complete hydroxylation would apparently form tetrahydroxy-stearic acid.

As further stated in said De Groote and Keiser Patent No. 2,023,997, it is immaterial whether an oxygen atom is introduced or two hydroxyl radicals are introduced into the octadecadiene acid to produce the oxy-octadecadiene acid body. It is obvious, of course, where a hydroxyl is formed, that one has a hydroxylated fatty acid or hydroxylated fatty acid compound, and that the fatty acid at least may act either as an alcohol or as an acid, in the same sense that ricinoleic acid may act as an alcohol or acid.

In the co-pending application for U. S. Letters Patent of Melvin De Groote, Bernhard Keiser and Arthur F. Wirtel, Serial No. 760,033, filed December 31, 1934, there is described a process for breaking petroleum emulsions by means of unpolymerized keto fatty acid bodies or materials.

It is well known that fatty acids or fatty bodies can be subjected to chemical treatment, so as to yield keto fatty acids, that is, fatty acids in which a ketonic group (a carbonyl group) is present. One example is the conversion of ricinoleic acid into ketohydroxystearic acid. (See Lewkowitsch "Chemical Technology of Oils, Fats and Waxes", 6th edition, volume 1, page 242.) In a general way, the manufacture of such ketonic acids is dependent upon the treatment of an unsaturated fatty body or fatty acid, such as ricinoleic acid, oleic acid, or the like, with a halogen, such as bromine, so as to form a halogen addition product, for example, ricinoleic acid dibromide, which is then converted into ricinstearolic acid. Ricinstearolic acid, on treatment with sulfuric acid, yields ketohydroxystearic acid.

In another co-pending application for patent of Melvin De Groote, Bernhard Keiser and Arthur F. Wirtel, Serial No. 760,032, filed December 31, 1934, there is disclosed the use of polyketo fatty acid bodies for the purpose of breaking petroleum emulsions. Polyketo fatty acids may be derived by polymerization of keto fatty acids which have been previously derived in the manner described by Lewkowitsch, mentioned above.

In the present application, the expression "keto fatty acids" or "keto fatty acid bodies" is intended to include both unpolymerized keto fatty acid bodies and polymerized polyketo fatty acid bodies. In many instances it is more economical to prepare the reagent employed in the present process from a polyketo fatty acid body than from an unpolymerized one. The reason for this is that it is more economical to produce polyketo fatty acid bodies than unpolymerized keto fatty acid bodies.

In the production of polyketo fatty acids or their salts or esters, by pressure oxidation at relatively low temperatures, one may employ any suitable unsaturated, hydroxylated fatty material, such as castor oil, ricinoleic acid, diricinoleic acid, or other material of the kind described in the aforementioned De Groote and Keiser patent, or any other suitable material. In the co-pending application for patent of Melvin De Groote, Bernhard Keiser and Arthur F. Wirtel, Serial No. 760,031, filed December 31, 1934, there is described a novel method for producing a new composition of matter consisting of polyketo fatty acids and their salts and esters, the said method involving pressure oxidation at relatively low temperatures, such as 135° C. or less, and the product resulting from said method consisting of materials high in polyketo fatty acids, which have the same characteristics as polyketo fatty acids derived by esterifying or condensing a keto fatty acid, such as ketohydroxystearic acid with ricinoleic acid or diricinoleic acid or oleic acid or triricinolein.

Briefly described, the method described in said pending application Serial No. 760,031, for producing such polyketo fatty acids by pressure oxidation, consists in mixing an unsaturated, hydroxylated, fatty body of the kind previously described, such as castor oil, with not over 10% of a true drying oil, such as linseed oil, or perilla oil, or the acids thereof, and subjecting the same to pressure oxidation at approximately 15 to 75 lbs. gauge pressure by means of ordinary moist air and at a temperature of not over 135° C., and preferably at about 120° C., for approximately 10 to 30 hours. A small amount of a fat splitting sulfonic acid, such as approximately ½% of Petroff reagent (oil-soluble petroleum sulfonic acids) may be present during oxidation.

It is well known, of course, that castor oil is an alcohol and in fact, a secondary alcohol. It is furthermore well known that ketonic acids are produced by the cautious oxidation of hydroxy acids containing the secondary alcoholic group, as for example, oxidation of lactic acid to pyroracemic acid. In said reaction the CH(OH) group is converted into a CO group. The cautious oxidation of castor oil or ricinoleic acid conducted under the previously specified conditions results in the formation of a ketonic acid, which may be indicated by the following formula:

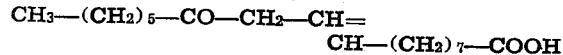

However, oxidation not only takes place at the hydroxyl position, but also at the ethylene linkage, with probably the absorption of oxygen and then conversion into hydroxyl groups, and thus the ketonic acid produced may represent a saturated, dihydroxy acid which may be indicated by the following formula:

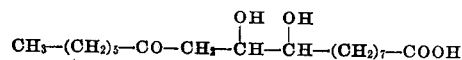

However, it is well known that oxidation reactions tend to polymerize or form ester acids, ethers, etc., and thus the resultant product represents ketonic acids in the polymerized form, i. e., derived from two or more molecules, at least one of which must contain a ketonic group. Obviously, such ketonic acids may be of the hydroxy type as well.

The formation of ketohydroxystearic acid in the usual manner (see Lewkowitsch "Chemical Technology of Oils, Fats and Waxes", 6th edition, volume 1, page 242) with subsequent reaction with ricinoleic acid, dircinoleic acid, oleic acid, triricinolein, etc. results in a compound representing substantially nothing other than polyketo acids. On the other hand, I am aware that the products obtained by pressure oxidation in the manner referred to previously, may result in products containing a significant amount or majority of polyketo acids, but may contain certain other non-ketonic material of the kind present in various conventional or special blown oils. Since such non-ketonic materials are also effective quite frequently for the treatment of oil field emulsions, I prefer to use the impure form of polyketo acids or their salts or esters, as obtained by pressure oxidation. This is purely a matter of economy. The pure forms, relatively free from extraneous materials, may be employed.

I am fully aware that migration may take place in a fatty molecule. For instance, that the formation of stearolactone from hydroxystearic acid appears to depend on the migration of the alcoholiform hydroxyl. I am also aware that in the case of the common non-fatty ketonic acid, aceto-acetic acid, that certain reactions are known to take place which suggest that aceto-acetic acid may, as far as those reactions are concerned, react more as an aldehyde or as an aldehydic acid than as a ketonic acid. Such wandering of a hydrogen atom and change in position of a double bond is referred to as keto-enolic tautomerism (Bernthsen "Textbook of Organic Chemistry", 2nd edition, 1931, page 231). I believe that this or a comparable change may take place in these polyketonic acids or bodies previously described, and possibly in regard to some reactions, these polyketo acids or esters thereof act more as if they were aldehydic acids or esters or salts thereof. In other words, if these polyketonic acid bodies are to be used in a mixture where aldehydic acids would be incompatible, it is also likely that these polyketonic acids or their esters may be incompatible, for the reason that they really may be aldehydic acid bodies. It is to be noted that the reagents of the kind employed for determining the presence of the carbonyl group in ketones also usually detect the presence of the carbonyl group in aldehydes. It is to be understood that in the claims where the products are characterized by the presence of ketonic radicals, that such acids might ultimately prove to be aldehydic acids, or at least, convertible under certain conditions of use, or else under certain conditions of identification, possibly they become converted into aldehydic acids, and it is not intended that the word "ketonic" or "keto" be interpreted as excluding the meaning of "aldehydic" in the sense previously described or discussed, i. e., that both have the carbonyl (CO) radical present, and their ultimate composition in carbon atoms, hydrogen atoms, and oxygen atoms is identical.

The present process, as differentiated from the processes of the previously mentioned co-pending applications for patent, which are also concerned with demulsification, is characterized by the fact that I employ a demulsifying agent of the kind in which there is present both an oxy-octadecadiene acid residue and a keto fatty acid residue in the same molecule. The fatty acid residue is characterized by the fact that it is obtained from castor oil. The formation of such materials is relatively simple. Since the oxy-octadecadiene acid may be considered as an acid alcohol type of reagent in the same sense that ricinoleic acid is an acid alcohol, one may obtain the same reaction from a molecule of oxy-octadecadiene acid and a molecule of keto fatty acid as one would obtain from two molecules of ricinoleic acid combining to form monobasic diricinoleic acid. Likewise, any other alcohol acid type of material, such as ricinoleic acid, hydroxystearic acid, or the condensation product of ethylene glycol with phthalic acid or with oxalic acid, or with maleic acid, may serve as a bridge or a connecting link by combination with a molecule of oxy-octadecadiene acid and a molecule of keto fatty acid. Such material, when it is to be used as a connecting link or bridge, must be amphoteric, if it can be employed to combine with a hydroxyl of an oxy acid and the carboxyl of the keto fatty acid. The keto acid may be of the hydroxy type, and act as an alcohol. The dehydration of two hydroxyl radicals, one from oxy keto acid or its salt, or ester, and the other from oxy-octadecadiene acid or its salt or ester, may result in an ether type reaction.

Other means of combination are readily available, such as the formation of a glyceride in which a molecule of oxy-octadecadiene acid and a molecule of keto fatty acid, are united with a molecule of glycerol. Likewise, two molecules of oxy-octadecadiene acid and one molecule of keto fatty acid, or else, two molecules of keto fatty acid and one molecule of oxy-octadecadience acid, may combine with one molecule of glycerol, to give a triglyceride. One molecule of oxy-octadecadiene acid and one molecule of keto fatty acid, may be united by means of ethylene glycol or some other similar glycol.

If the oxy acid, that is, oxy-octadecadiene acid, is acting by virtue of its alcoholic hydroxyl, one need not employ the acid itself, but one may employ any suitable salt, such as a sodium salt, ammonium salt, potassium salt, or amine salt, such as the triethanolamine salt. Where the oxy acid is acting by virtue of its carboxylic hydrogen, one need not use the acid itself, but one may employ a combination wherein the alcoholic hydroxyl has already been combined with some other acid, such as ricinoleic. All these reactions are essentially esterification reactions. As such, they are best promoted at a fairly high temperature, and preferably, slightly above the boiling point of water. The passing of dry hydrochloric acid gas hastens the reaction.

It may be possible to conduct the oxidation of castor oil (or ricinoleic acid, or polyricinoleic acid derived from castor oil), and the oxidation of octadecadiene acid simultaneously so that oxy-octadecadiene acid or oxy-octadecadiene acid bodies and polyketo fatty acids or polyketo fatty acid bodies are produced simultaneously and react further, so as to produce a molecule which is characterized by the presence of both an oxy-octadecadiene acid residue and a keto fatty acid residue. Such procedure may prove the most valuable means of producing the reagent employed in the present process of breaking petroleum emulsions.

The treating agent or demulsifying agent that I prefer to use in practicing my process is obtained by heating a molecular weight of polyketo fatty acids derived by the oxidation of ricinoleic acid, with a molecular weight of oxy-octadecadiene acid glyceride derived by the oxidation of octadecadiene acid glyceride, obtained by the pyrolysis of castor oil. Such materials may be heated together, and when so treated, produce a very valuable demulsifying agent for breaking crude oil emulsions.

If desired, any free acidity which is present in the preferred reagent may be neutralized by triethanolamine, or by any other suitable amine, such as monoamylamine, benzylamine, etc. The free acidic carboxyl may be converted into a salt, such as a sodium, potassium, or ammonium salt. The free acidic carboxyl, of course, may be combined with an alcohol, such as ethyl, methyl, or propyl alcohol, or with glycerine.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc. may be employed as diluents. Miscellaneous solvents, such as pine oil, carbon tetrachloride, sulfur dioxide extract obtained in the refining of petroleum, etc. may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, the alkylated sulfo-aromatic type, etc.

It is well known that conventional demulsifying agents may be used in a water-soluble form, or in an oil-soluble form, or in a form exhibiting both oil and water solubility. Sometimes they may be used in a form which exhibits relatively limited water-solubility and relatively limited oil solubility. However, since such reagents are sometimes used in a ratio of 1 to 10,000, or 1 to 20,000, or 1 to 30,000, such an apparent insolubility in oil and water is not significant, because said reagents undoubtedly have solubility within the concentration employed. This same fact is true in regard to the material or materials employed as the demulsifying agent of my process.

In practising my invention a treating agent or demulsifying agent of the kind above described is brought into contact with or caused to act upon the emulsion to be treated, in any of the various ways or by any of the various apparatus now generally used to resolve or break petroleum emulsions with a chemical reagent.

Having thus described my invention, what I claim as new and desire to secure by Letters Patent is:

1. A process for breaking petroleum emulsions of the water-in-oil type, which consists in subjecting the emulsion to the action of a demulsifying agent comprising a chemical compound characterized by the presence of both an oxy-octadecadiene acid residue and a keto fatty acid residue derived from castor oil in the same molecule.

2. A process for breaking petroleum emulsions of the water-in-oil type, which consists in subjecting the emulsion to the action of a demulsifying agent comprising a chemical compound in the form of a salt, characterized by the presence of both an oxy-octadecadiene acid residue and a keto fatty acid residue derived from castor oil in the same molecule.

3. A process for breaking petroleum emulsions of the water-in-oil type, which consists in subjecting the emulsion to the action of a demulsifying agent comprising a chemical compound in the form of an acid, characterized by the presence of both an oxy-octadecadiene acid residue and a keto fatty acid residue derived from castor oil in the same molecule.

4. A process for breaking petroleum emulsions of the water-in-oil type, which consists in subjecting the emulsion to the action of a demulsifying agent comprising a chemical compound in the form of an ester, characterized by the presence of both an oxy-octadecadiene acid residue and a keto fatty acid residue derived from castor oil in the same molecule.

MELVIN DE GROOTE.